United States Patent
Chamley et al.

(10) Patent No.: US 8,327,036 B2
(45) Date of Patent: Dec. 4, 2012

(54) METHOD OF PASSING INSTRUCTIONS BETWEEN A HOST STATION AND A PORTABLE ELECTRONIC DEVICE, AND DEVICE FOR IMPLEMENTATION

(75) Inventors: Olivier Chamley, Leognan (FR); Stéphane Andreau, Merignace (FR)

(73) Assignee: Oberthur Technologies, Paris (FR)

( * ) Notice: Subject to any disclaimer, the term of this patent is extended or adjusted under 35 U.S.C. 154(b) by 162 days.

(21) Appl. No.: 12/513,404

(22) PCT Filed: Nov. 6, 2007

(86) PCT No.: PCT/EP2007/061938
§ 371 (c)(1),
(2), (4) Date: Jun. 8, 2009

(87) PCT Pub. No.: WO2008/055902
PCT Pub. Date: May 15, 2008

(65) Prior Publication Data
US 2010/0070655 A1    Mar. 18, 2010

(30) Foreign Application Priority Data
Nov. 6, 2006    (FR) ...................................... 06 09673

(51) Int. Cl.
*G06F 3/00* (2006.01)
(52) U.S. Cl. ...................... 710/3; 710/5; 710/30; 710/32
(58) Field of Classification Search .................. 710/3, 5, 710/30, 32
See application file for complete search history.

(56) References Cited

U.S. PATENT DOCUMENTS

| | | | | |
|---|---|---|---|---|
| 7,427,027 | B2 * | 9/2008 | Elhamias et al. | 235/451 |
| 7,739,487 | B2 * | 6/2010 | Mylly et al. | 713/1 |
| 7,926,720 | B2 * | 4/2011 | Elhamias et al. | 235/451 |
| 8,078,788 | B2 * | 12/2011 | Chang et al. | 710/315 |
| 2004/0122829 | A1 * | 6/2004 | Sakurai et al. | 707/100 |
| 2004/0210715 | A1 | 10/2004 | Harari et al. | |
| 2005/0086421 | A1 | 4/2005 | Nassar | |
| 2006/0101199 | A1 | 5/2006 | Ahvenainen | |
| 2006/0206681 | A1 * | 9/2006 | Suzuki et al. | 711/170 |

FOREIGN PATENT DOCUMENTS

EP    1 304 665    4/2003

(Continued)

OTHER PUBLICATIONS

ISO: "Identification Cards—Integrated Circuit Cards—Part 4: Organization, Security and Commands for Interchange ISO/IEC 7816-4", International Standard ISO/IEC, XX, XX, Jan. 5, 2005, pp. 90, XP008077622.

(Continued)

*Primary Examiner* — Chun-Kuan Lee
*Assistant Examiner* — Jasjit Vidwan
(74) *Attorney, Agent, or Firm* — Lowe, Hauptman, Ham & Berner, LLP

(57) ABSTRACT

The method includes in placing an instruction presence parameter in the "argument" field of a binary word defining a read/write command generated by generic management programs (drivers) for removable data storage units. This makes it possible to circumvent the limitation of the set of the commands authorized by a generic program for managing a removable data storage unit, without running the risk of data being interpreted wrongly as instructions.

10 Claims, 2 Drawing Sheets

FOREIGN PATENT DOCUMENTS

| | | |
|---|---|---|
| EP | 1 571 557 | 9/2005 |
| JP | 2001-147850 | 5/2001 |

OTHER PUBLICATIONS

Samsung Electronics: "S3F49DAX MultiMediaCard Controllers Datasheet Revision 1.0" Internet Citation, [Online] Aug. 17, 2004, XP002369242, Extrait de l'Internet: URL:http://origin.samsung.com/Products/Semiconductor/SystemLSI/Microcontorllers/32_bit/MemoryCardController/S3F49DAX/ds_s3f49dax_rev10.pdf> [extrait le Feb. 7, 2006].

Office Action issued on corresponding European Application No. 07 822 255.1 on Nov. 8, 2010.

* cited by examiner

METHOD OF PASSING INSTRUCTIONS BETWEEN A HOST STATION AND A PORTABLE ELECTRONIC DEVICE, AND DEVICE FOR IMPLEMENTATION

CROSS-REFERENCE TO RELATED APPLICATIONS

The present Application is based on International Application No. PCT/EP2007/061938, filed on Nov. 6, 2007, which in turn corresponds to French Application No. 0609673, filed on Nov. 6, 2006, and priority is hereby claimed under 35 USC §119 based on these applications. Each of these applications are hereby incorporated by reference in their entirety into the present application.

DOMAIN OF THE INVENTION

The invention relates to the passing of instructions to a microcircuit card, by means of a generic program for managing a removable data storage unit belonging to the category of "drivers" systematically associated with the operating systems of microprocessor-based electronic equipment such as personal computers, digital cameras, camcorders, digital personal stereos, portable telephones, etc.

TECHNICAL BACKGROUND

Removable data storage units with flash memories, for personal computers and electronic appliances packaged very compactly—MMC memory card (the acronym standing for the expression "Multimedia Memory Card") or USB key of "Mass Storage" type—are increasingly widespread. Initially envisaged for connecting to personal computers via input-output ports of USB type (the acronym standing for the expression "Universal Serial Bus") or the like, these removable data storage units originally required the presence of a specific driver in the host station. As this hindered their portability, generic drivers have been rapidly developed, targeted at the main operating systems such as Windows®, Mac®, Unix®, Linux®, etc., operating on existing personal computers.

These generic drivers for managing removable data storage units such as, for example, drivers adapted for the communication protocol of the "USB mass storage device class" type, use specific protocols, endowed with a limited command set, for transactions between host station and removable data storage unit. Thus, according to the MMC-standard protocol, a removable data storage unit having a MMC card communicates with a host station via a limited set of standard commands intended for managing its memory space, including commands for reading and writing data.

Very rapidly, the need was felt to overcome the limitations of the command sets of these generic drivers by using the data exchanged in the course of a transaction initiated by a standard read/write command to pass additional instructions to the removable storage units from a host station.

Thus, Japanese patent application JP 2001-147850 proposes a scheme for authorizing or prohibiting the writing and/or reading of the memory space or of parts of the memory space or even only of files of a removable data storage unit without transmitting specific commands other than those authorized by a generic driver for managing a removable data storage unit. In this scheme, read/write authorization/prohibition state flags are associated with the physical addresses stored in the file allocation table FAT. A password precedes the data placed at the physical addresses forming the subject of a read/write restriction. In order to be considered, each read/write command in respect of physical addresses forming the subject of read/write restriction must be followed by a password alone for a read command or placed in the header of the data to be written for a write command. The password associated with a read/write command pertaining to a memory space or a file constrained by a read/write restriction must correspond to the password registered in order for the command to be executed.

It has also been proposed, in European patent application EP 1.571.557, that commands and/or data be passed to a removable data storage device by way of a standard write command originating from the generic driver of a personal computer operating system, by introducing into the data to be written a command identification flag detected and interpreted by the microcontroller managing the removable storage device as marking the presence of a command in the received data. Each data packet dispatched for writing to the removable storage device begins with a header field which may or may not contain the command identification flag and which is analyzed by the microcontroller managing the removable storage device prior to consideration of the data.

The passing of a command presence signaling or of a password by way of the data to be written in the removable data storage device exhibits the drawback of permitting fortuitous reproduction of command signaling or of a password by the ordinary data to be written that could lead the microcontroller of the removable device to an erroneous interpretation of write data as commands or a password.

The aim of the present invention is to substantially remedy the aforesaid drawback.

SUMMARY OF THE INVENTION

Its subject is a method of passing instructions between a microprocessor host station and a portable electronic device linked by a data transmission, by means of a transaction initiated by a data packet read/write command, generated within the host station, by a removable data storage unit management program and transmitted to the portable electronic device in the form of a binary code comprising an index defining the type of read/write command concerned and an argument containing one or more parameters specifying the manner of applying the read/write command type defined in the index to the portable electronic device. This method is noteworthy in that an instruction is signaled to the portable electronic device by means of an instruction presence parameter, placed in the argument of a read/write command.

Thus, it is possible to command a portable electronic device to carry out processing other than the writing and reading of data while being limited to the write and read commands generated by existing manager programs associated with the operating systems of the host stations.

Advantageously, an instruction is passed to the portable electronic device by way of a data packet write command whose argument incorporates an instruction presence parameter defining the instruction.

Advantageously, an instruction is passed to the portable electronic device by way of a data packet write command whose argument incorporates an instruction presence parameter signaling an instruction in the data packets to be written.

Advantageously, an instruction is passed to the portable electronic device by way of a data packet write command whose argument incorporates an instruction presence parameter signaling a command script incorporating a series of instructions, in the data packets to be written.

Advantageously, the instruction presence parameter points, in the portable electronic device, to a preexisting-file address.

Advantageously, the data resulting from the execution of an instruction by the portable electronic device are placed in memory locations of the portable electronic device that are consultable by means of an instruction passed to the portable electronic device by way of the argument of a data packet read command.

Advantageously, the data resulting from the execution of an instruction by the portable electronic device are placed in volatile-memory locations of the portable electronic device that are consultable by means of an instruction passed through the host station to the portable electronic device by way of the argument of a data packet read command.

Advantageously, the instructions are of APDU type (the acronym standing for the expression: "Application Protocol Data Unit), defined by the ISO 7816 standard.

Advantageously, the instructions are requests transmitted to the portable electronic device by way of data packet write commands and responses of the portable electronic device that are consultable by way of packet read commands, requests and responses complying with an Internet protocol.

Advantageously, the requests transmitted to the portable electronic device by way of data packet write commands and the responses of the portable electronic device that are consultable by way of packet read commands comply with the http protocol.

Its subject is also a portable electronic device for the implementation of the above method equipped with a USB-standard input-output port.

Advantageously, the portable electronic device is a microcircuit card.

Advantageously, the portable electronic device is an electronic key.

Advantageously, the removable data storage unit management program complies with the MMC specification.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

a FIG. 1 is a functional diagram of a removable portable electronic device linkable to a microprocessor host station, a FIG. 2 is a chart illustrating the composition of a binary word defining a write command in accordance with the MMC transaction protocol, a FIG. 3 is a chart illustrating a data read transaction in accordance with the MMC transaction protocol, and a FIG. 4 is a chart illustrating a possible operating mode for the microcontroller of an item of portable electronic equipment implementing the method according to the invention.

DETAILED DESCRIPTION OF THE INVENTION

Figure 1:
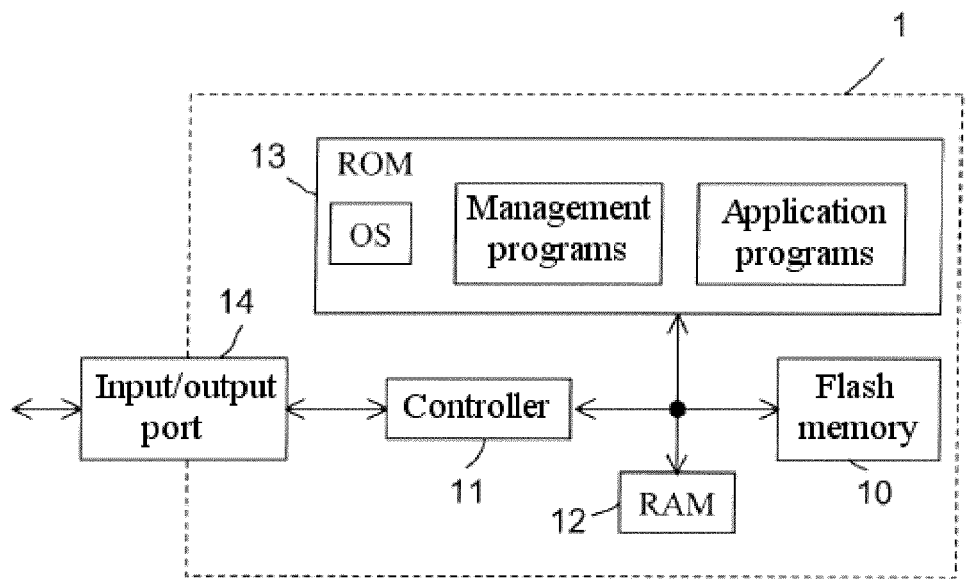

FIG. 1 shows the functional diagram of a removable portable electronic device such as a microcircuit card 1 designed at one and the same time for storing data and for controlling the execution of a banking transaction or the like, by a computer system provided with a suitably adapted communication terminal termed a "microcircuit card reader" which constitutes a host station. This microcircuit card 1 comprises a flash memory 10, a management microcontroller 11 provided with a RAM volatile work memory 12 and with a ROM nonvolatile program memory 13 and an input-output port 14 linked by an internal bus to the management microcontroller 11.

The input-output port 14 of the microcircuit card 1 can be placed in communication with an input-output port of a host station. Here, this is a serial port compatible with the SPI standard (the acronym standing for the expression: "Serial Peripheral Interface Bus") supporting the MMC transaction protocol, very suitable for flash memory cards. But it could be quite another type of communication port, such as an SDC port (the acronym standing for the expression: "Secure Digital memory Card"), a USB port, an RS232 serial port, a GPIO port (the acronym standing for the expression: "General Purpose Input/Output") in the $I^2C$ transmission format (the acronym standing for the expression: "Inter Integrated Circuit Bus"), or SMBus (the acronym standing for the expression: "System Management Bus"), a PCMCIA port, etc., with a transaction protocol offering a limited command set including standard commands for reading/writing data, coded by a binary word comprising at least one index field specifying a type of read/write command and an argument field containing one or more parameters specifying the manner of applying the read/write command type defined in the index.

The MMC transaction protocol is more particularly oriented towards managing a removable data storage unit having a memory space which appears to the host station as a volume organized into sectors or blocks of the same capacity and which is managed by the generic driver of a host station by means of logical block addresses which the management microcontroller 11 of the removable unit matches up with physical block addresses.

Figure 2:
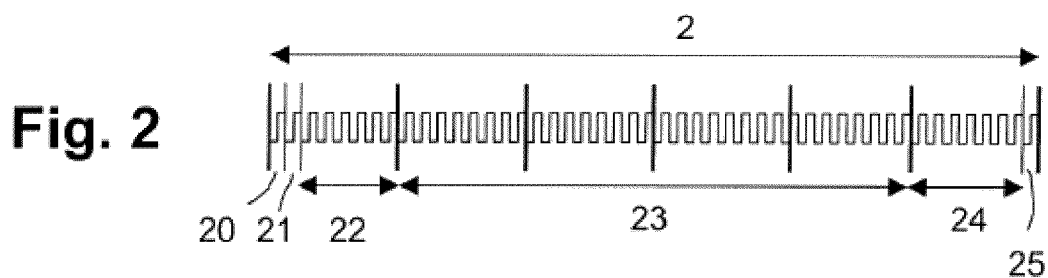

FIG. 2 illustrates the composition of the frame 2 of a binary word coding a command of the MMC transaction protocol. It is composed of 6 bytes successively incorporating:

a start bit 20 always at the value 0, a transfer bit 21 always at the value 1, an index field 22 occupying 6 bits and identifying the type of the command, an argument field 23 of 4 bytes containing a command parameter such as a start-of-read/write logical block address or the number of blocks affected by the subsequent read/write operations, an error corrector code 24 of 7 bits and, an end bit 25 always at the value 1.

A command is followed by an inactivity time corresponding to a response lag accorded to the microcircuit card 1. The latter 1 confirms receipt of an order by a response or acknowledgment of 1 to 2 bytes indicating error conditions. Then the data to be exchanged, when there are any, are emitted in the form of data packets.

Figure 3:
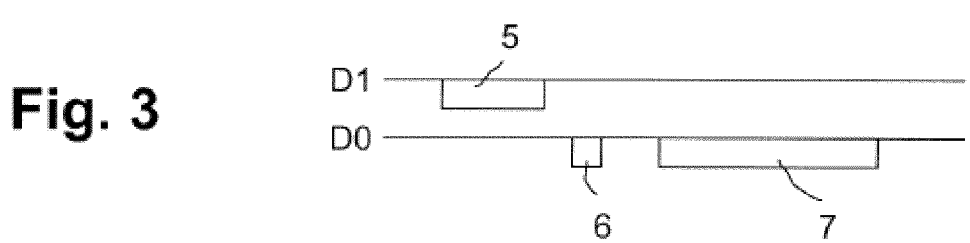

FIG. 3 illustrates the conduct of a transaction for reading a block. The removable unit generic management program of the host station dispatches to the microcircuit card 1 on the line D1 a command 5, identified by its index, to read one or more blocks, with the logic address of the first block to be read in its argument. The microcircuit card 1 responds on the line D0 by acknowledging 6 and then by making available to the packet 7 the data read in the block whose logic address corresponds to that figuring in the argument of the read command. For a transaction involving reading several blocks, the microcircuit card responds by an acknowledgment followed by the series of data packets read in the various blocks. A write command is conducted in the same manner, except for the fact that the data packets dispatched by the host station are on the line D1.

To increase the number of available commands, which is limited in the case of the MMC transaction protocol to the capacity of a quarter of a byte, that is to say 64, part of the capacity for addressing the argument field 23 of the read or write commands, considered in the wide sense, that is to say including the commands indirectly related to writing or to reading such as, for example, the command CMD16 for enumerating the blocks to be read or written (known by the abbreviation: "SET_BLOCKLEN"), is reserved for an instruction presence parameter. The latter is then interpreted by the microcircuit card 1 as an order for disabling the execution of the read or write command received, for searching for an instruction in the argument of the command and/or in the data packet or packets to be written in accordance with a write command, and for executing the instruction found. The instruction presence parameter can identify an instruction by itself or signify the presence of an instruction in the data packet or packets of a write command.

The instruction presence parameter can point, in a write command, to a preexisting-file address which since its detection by the microcontroller 11 of the microcircuit card 1 disables the execution of the write command and replaces it with a search for an instruction followed by the execution of the instruction found.

As a response to a write command according to the MMC transaction protocol is always dispatched before write data, the data resulting from the execution of an instruction by the microcircuit card 1 are recovered by the host station by means of a read command.

Figure 4:
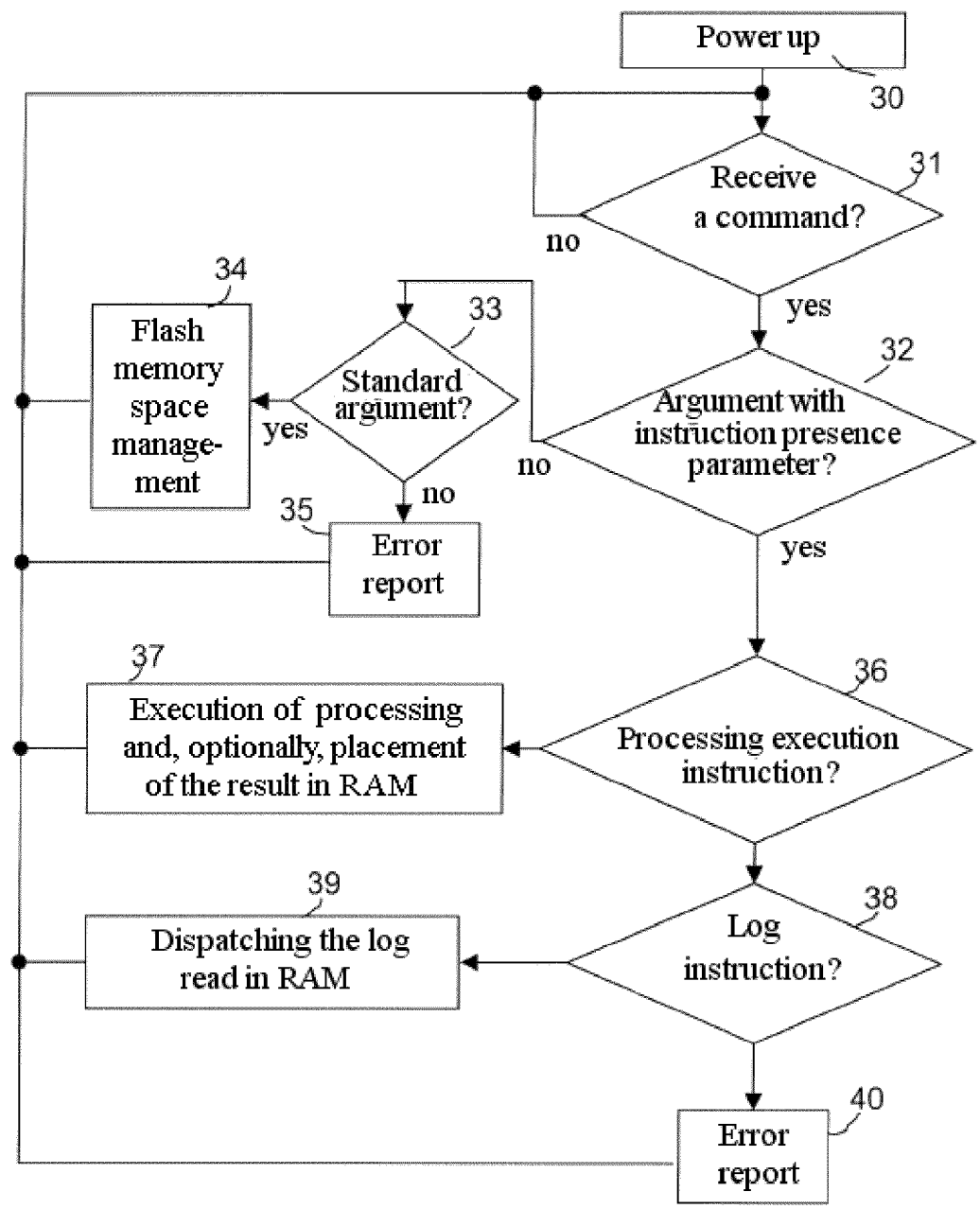

FIG. 4 is an operating chart illustrating a way in which the microcontroller 11 of the microcircuit card 1 functions.

On startup, on power-up 30 of the microcircuit card 1 achieved by plugging it into a connector of a host station in activity, the microcontroller 11 of the microcircuit card 1 initializes itself and places itself, at 31, on standby awaiting a command in accordance with the MMC protocol originating from the host station.

As soon as the microcircuit card receives a command in accordance with the MMC protocol originating from the host station, its microcontroller 11 detects it and analyzes its argument at 32 so as to search therein for an instruction presence parameter.

When the microcontroller 11 does not pinpoint any instruction presence parameter in the command, it examines at 33 whether the argument of the command is compatible with the command type announced in the index field. If there is compatibility, it executes at 34 the command which involves the management of the flash memory 10 and places itself on standby awaiting a new command. If there is no compatibility, it emits at 35 an error signaling, through the acknowledgment message, and places itself on standby awaiting a new command.

When the microcontroller pinpoints an instruction presence parameter in the argument of the command, it interprets it so as to locate the instruction, either in the argument of the command in which the parameter figures, or in data to be written, and analyzes at 36 the instruction so as to recognize whether it corresponds to a processing execution request.

If the instruction corresponds to a processing execution request, it executes at 37 the requested processing, places, if necessary, the result obtained in its volatile memory 12 so as to allow its consultation by a subsequent instruction of the host station and places itself on standby awaiting a new command.

If the instruction does not correspond to a processing execution request, it seeks at 38 to ascertain whether it corresponds to an execution log request pertaining to an earlier instruction. If such is the case, it dispatches at 39, to the host station, its log that it may optionally have provisionally placed in its RAM memory 12 and places itself on standby awaiting a new command. The dispatching is done preferably by the data packet or packets awaited in response to a read command transmitting the log request instruction through its argument.

Finally, if the instruction corresponds neither to a processing execution request, nor to a log request, the microcontroller dispatches at 40 an error signaling, through the acknowledgment message, and places itself on standby awaiting a new command.

A log request instruction can be passed as argument of a read command. In this case the log is returned by the microcircuit card in the series of packets of the data read. When the awaited log is very short, the log request instruction can also be passed through an instruction presence parameter placed in the argument of a write command, and the log returned through the acknowledgment message following the command.

It is possible to submit on condition, the execution of an instruction by the microcircuit card, with the aid of a flag value associated with the instruction, signaling the satisfaction or non-satisfaction of the condition. For example, during the conduct, under the control of the microcircuit card 1, of a banking or other transaction executed by a computer system linked to the host station, involving message exchanges between the microcircuit card 1 and the computer system accessible from the host station, the execution by the microcircuit card 1 of a request from the host station reaching it through an instruction can be conditioned on the prior receipt by the microcircuit card 1, of an instruction for consulting execution results that are placed in the volatile memory 12 of the microcircuit card 1.

When an instruction of the host station destined for the microcircuit card 1 is accompanied by parameters, it is preferably transmitted with its parameters, by the data packets of a write command whose argument incorporates an instruction presence parameter. It can also be transmitted by the argument of the write command, its parameters when they exist being transmitted in the data packets to be written.

An instruction can also be stored in the microcircuit card, the instruction presence parameter then serves to locate it within the microcircuit card.

An instruction can be in accordance with the APDU transaction protocol (the acronym standing for the expression "Application Protocol Data Unit") defined in the ISO 7816 standard, just like the response resulting from the execution of the instruction by the microcircuit card 1. When it involves a request to make a directive available, it is passed by the host station to the microcircuit card 1, preferably, by way of a data packet read command whose argument points to the address of a memory location reserved for the communication of the directive on the part of the portable electronic device.

More generally, the host station's requests transmitted to the microcircuit card 1, preferably by data packet write commands, and the responses of the microcircuit card 1 that are consultable by the host station by way of data packet read commands may comply with the http 1.0 Internet protocol (the acronym standing for the expression "HyperText Transfer Protocol") or with the FTP Internet protocol (the acronym standing for the expression: "File Transfer Protocol").

An instruction can be a command script, for example complying with the Java® specification, placed in the data packet or packets following a write command whose argument incorporates an instruction presence parameter forewarning of the presence of instructions in the data packet or packets to be written.

Numerous variants are conceivable. The microcircuit card can be mounted in a USB key managed by a host station according to an SCSI transaction protocol (the acronym standing for the expression: "Small Computer System Interface") such as SBC-2 (the acronym standing for the expression: "SCSI Blocks Command") which exhibits a limited command set including commands for reading/writing the blocks of a memory space for storing data, coded by a binary word comprising an index field identifying the type of read/write command, and an argument field containing parameters such as a start-of-read-or-write logical block address.

Thus, a processing execution instruction can be passed to a microcircuit card by means of a simultaneous write and verify command of the SCSI protocol, the flag "Expected initial logical block reference tag" figuring in the argument of this command being able to be used as a supplement with the instruction presence parameter using the location of the logical block address to signify the presence of instructions in the data packet or packets to be written. Likewise, a log request instruction can be passed by means of a read command comprising the instruction presence parameter at the location of the argument reserved for the logical block address.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of passing instructions between a microprocessor host station and a portable electronic device linked by a data transmission, by means of a transaction initiated by a data packet read/write command, generated within the host station, by a removable data storage unit management program, where a data packet read/write command is transmitted to the portable electronic device in a standardized binary code format comprising an index defining a read/write command type and an argument having one or more parameters specifying a manner of applying the read/write command type defined in the index to the portable electronic device, wherein an instruction is signaled to the portable electronic device by means of an instruction presence parameter being placed in the argument of a write command and the instruction presence parameter pointing to a preexisting-file address, and wherein the portable device detects the instruction presence parameter, disables the execution of the write command and replaces it with a search for an instruction followed by an execution of the instruction found.

2. The method as claimed in claim 1, wherein the data resulting from an execution of an instruction by the portable electronic device are placed in memory locations of the portable electronic device that are consultable by means of an instruction passed to the portable electronic device by way of the argument of a data packet read command.

3. The method as claimed in claim 1, wherein the data resulting from an execution of an instruction by the portable electronic device are placed in volatile-memory locations of the portable electronic device that are consultable by means of an instruction passed to the portable electronic device by way of the argument of a data packet read command.

4. The method as claimed in claim 1, wherein the instructions are of the APDU type defined in the ISO 7816 standard.

5. The method as claimed in claim 1, wherein the requests transmitted to the portable electronic device by way of data packet write commands and the responses of the portable electronic device that are consultable by way of packet read commands comply with an Internet protocol.

6. The method as claimed in claim 5, wherein requests and responses comply with the http protocol.

7. The method as claimed in claim 1, the portable electronic device comprising a USB-standard input-output port.

8. The method as claimed in claim 1, the portable electronic device having a microcircuit card.

9. The method as claimed in claim 1, the portable electronic device having an electronic key.

10. The method as claimed in claim 1, wherein the removable data storage unit management program complies with the MMC specification.

* * * * *